April 5, 1938.  R. H. MADDOCK  2,113,540
VEHICLE FRAME
Filed Oct. 3, 1932  3 Sheets-Sheet 1
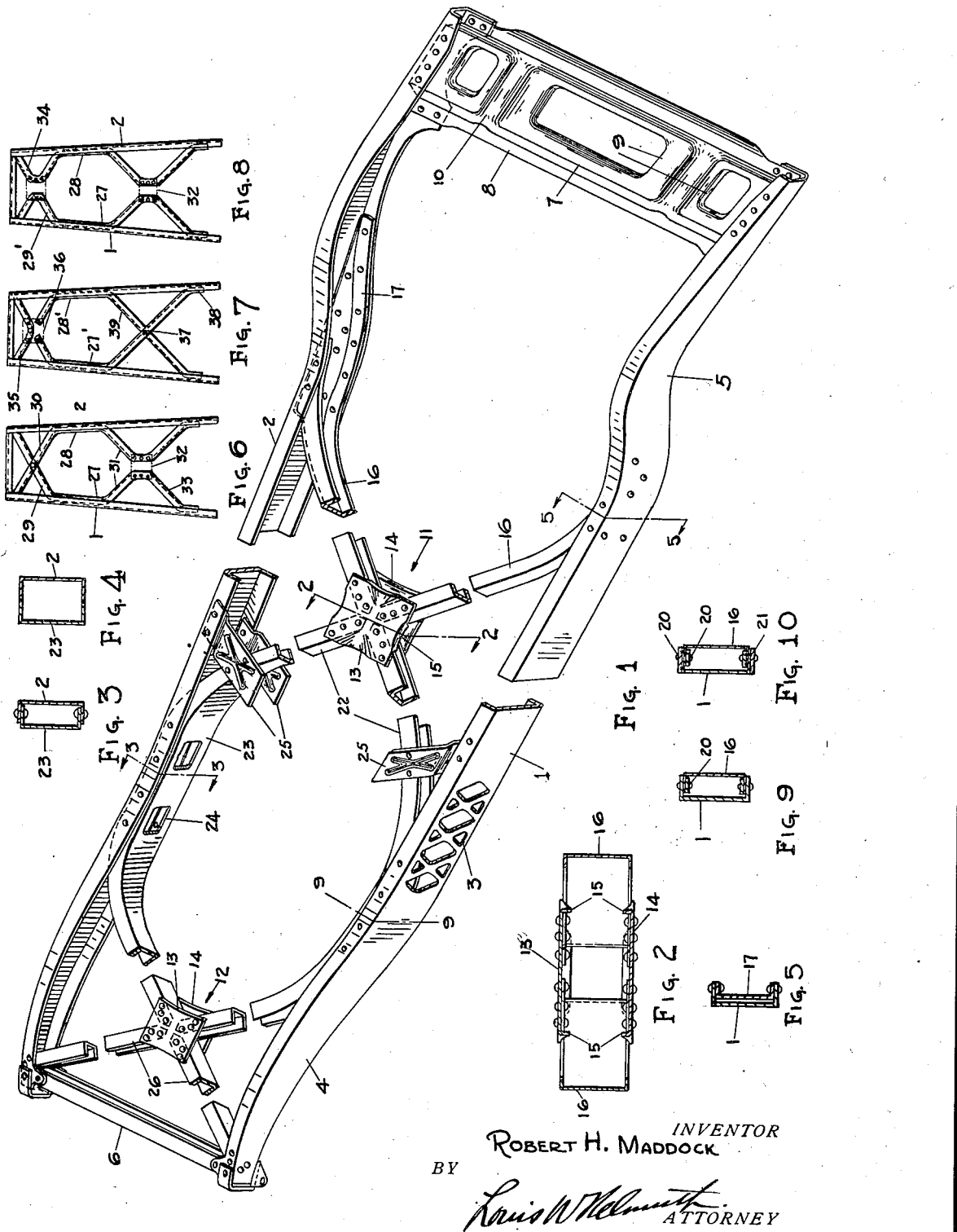
INVENTOR
Robert H. Maddock
BY
*Louis W. Helmuth*
ATTORNEY

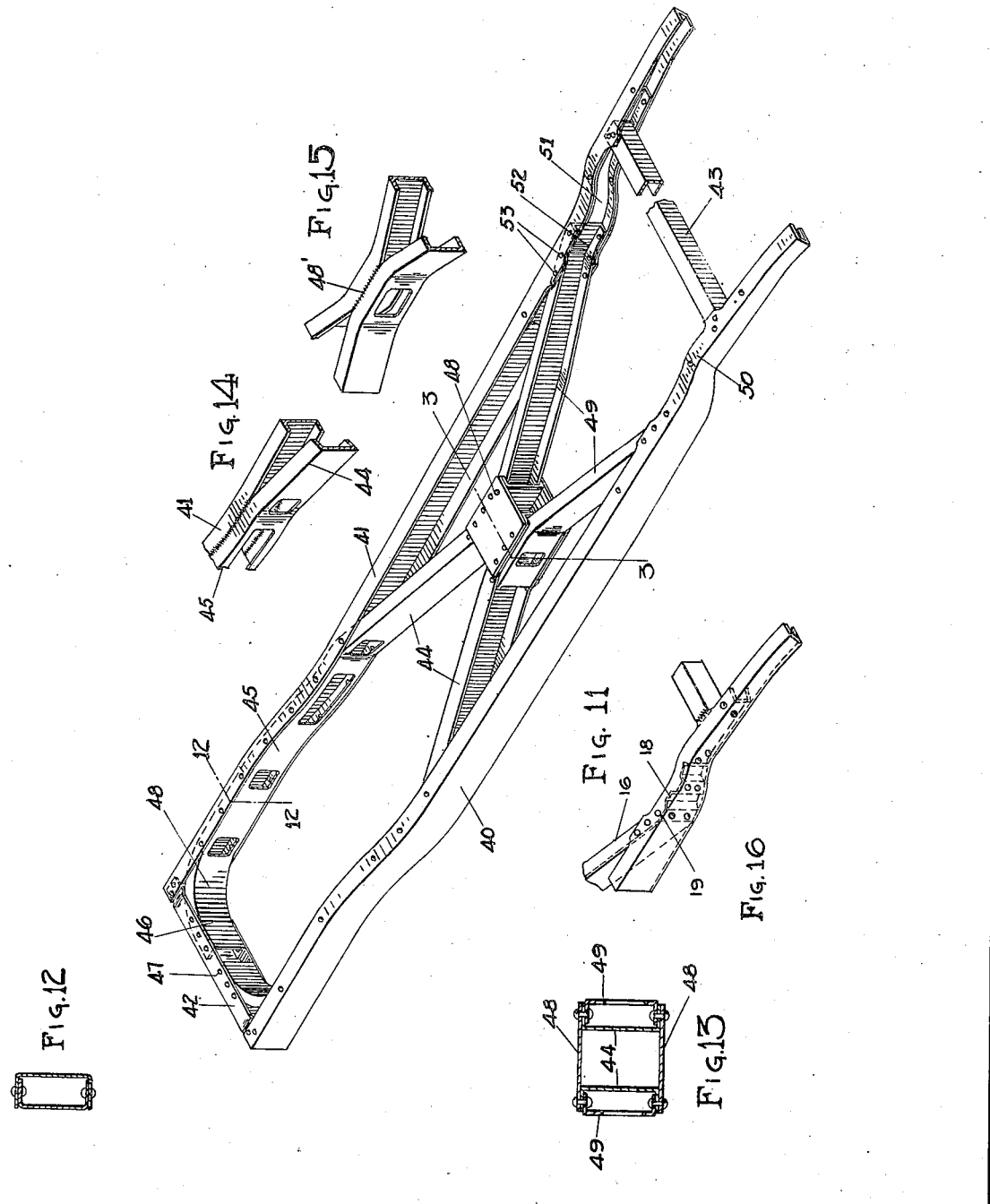

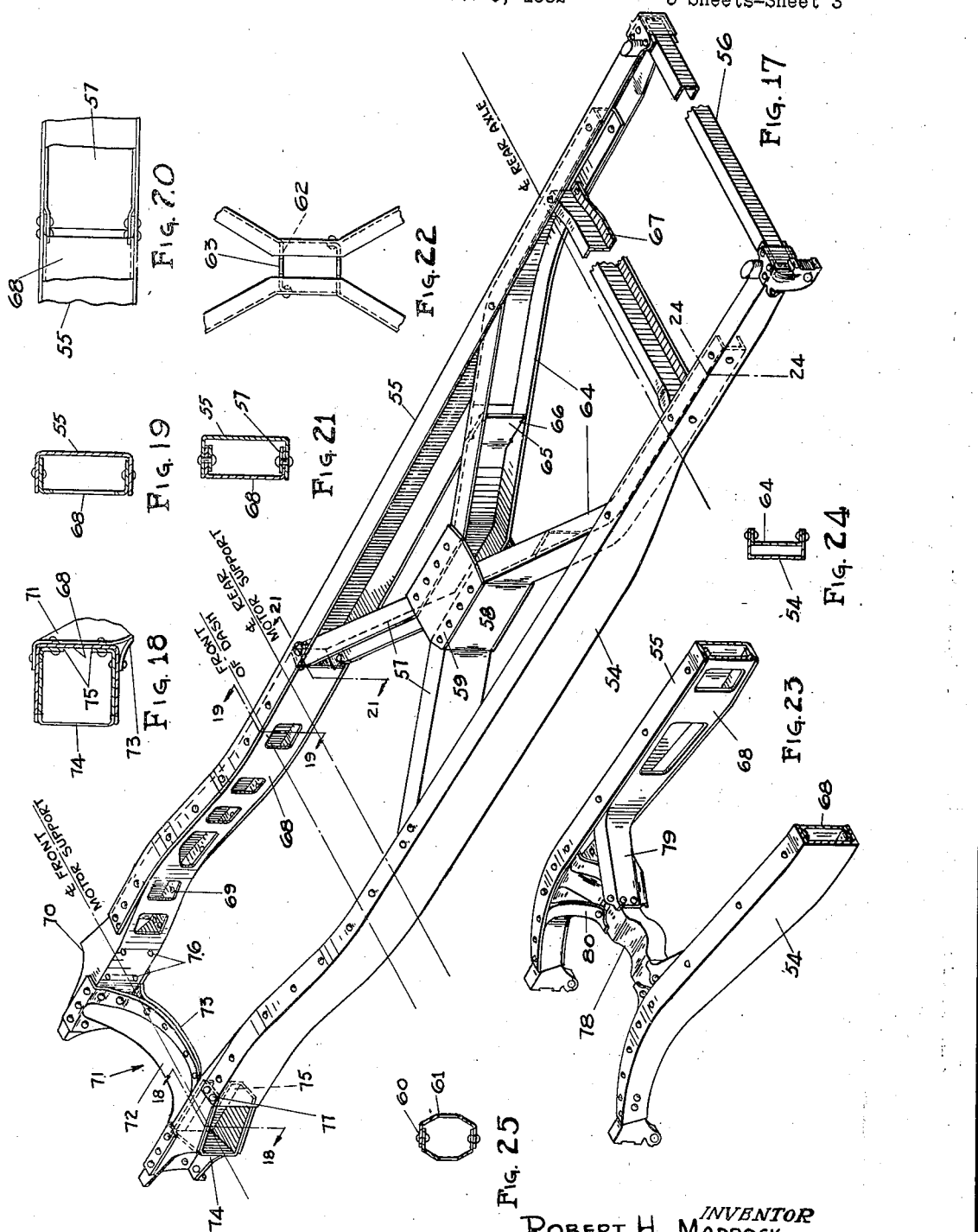

Patented Apr. 5, 1938

2,113,540

UNITED STATES PATENT OFFICE 2,113,540

VEHICLE FRAME

Robert H. Maddock, Cleveland, Ohio, assignor to The Midland Steel Products Company, Cleveland, Ohio, a corporation of Ohio Application October 3, 1932, Serial No. 635,960

25 Claims. (Cl. 280—106)

This invention relates to new and useful improvements in vehicle frames and more particularly to the automotive type.

An important object of the invention is to provide constructions for increasing the strength and rigidity of frames, whereby, if desired, lighter gauge material can be employed in their construction.

Another important object of the invention is to provide special forms and arrangements of torsionally strong reinforcing members which uniformly distribute imposed stresses and increase the resistance of the frame and its component parts to shear and bending stresses.

Another important object is to form certain portions of the side rails into hollow cross section for increasing torque resistance and to employ forms of transverse brace members which act concertly with the reinforced portions of the frame to materially reduce tendencies of the forward end of the frame to shimmy or vibrate laterally under road conditions.

Another paramount object of the invention is to provide a torque resisting member for connecting the two side rails adjacent their extreme forward ends to transmit torque and stress from one rail to the other and back along reinforced portions of the side rails to a second torsion resisting cross member which acts to absorb and distribute stresses equally throughout the frame.

Another object of the invention is to provide frame construction which lends itself either to riveting or welding of the component parts, including the parts forming the X-shaped member in a manner allowing ample clearance for the projection of the propeller or drive shaft through the body of the member.

Other objects and advantages of the invention will become apparent during the course of the following description.

In the accompanying drawings forming a part of the description and wherein like numerals are employed to designate like parts throughout the several views, Fig. 1 is a perspective view of one form of the improved frame with parts thereof broken away to more clearly illustrate the formation of component parts, Fig. 2 is a transverse section taken through the body of one of the X-shaped members on the line 2—2 of Fig. 1, Fig. 3 is a transverse section taken on the line 3—3 of Fig. 1, Fig. 4 is a transverse section of a modified form of construction taken on the line 3—3 in which the flanges of the reinforcing member are butt-welded to the flanges of the side rail, Fig. 5 is a transverse section taken on the line 5—5 of Fig. 1, Figs. 6, 7, and 8 are modified forms of the invention.

Figs. 9 and 10 are transverse sections taken on lines similar to 5—5 of Fig. 1 illustrating connections between cross members and side rails to prevent crushing of such light gauge stock as may be employed.

Fig. 11 is a perspective view of a modification of the invention.

Fig. 12 is a transverse section of the same taken on the line 2—2 of Fig. 11,

Fig. 13 is a transverse section taken through the intersection of the members forming the X-shaped member on the line 3—3 of Fig. 11.

Fig. 14 is a fragmentary perspective view illustrating one manner of connecting the arms of the X member with the side rails, Fig. 15 is a fragmentary perspective view of a welded construction for the X member, Fig. 16 is a fragmentary perspective view of the reinforcement provided at the rear kick-up of the frame, Fig. 17 is a perspective view of another modified form of frame, Fig. 18 is a fragmentary transverse section taken on the line 2—2 of Fig. 17, Fig. 19 is a transverse section taken on the line 3—3 of Fig. 17, Fig. 20 is a side elevation of a fragment of the side rail at the juncture of a reinforcing member and one of the arms of the X-shaped member, Fig. 21 is a transverse section of this joint taken on the line 5—5 of Fig. 17, Fig. 22 is a top plan of a modified form of X member, Fig. 23 is a fragmentary perspective view showing a modified form of front construction for this frame, Fig. 24 is a transverse section of a side rail taken on the line 24—24 of Fig. 17, Fig. 25 is a transverse section taken through the intersection of a modified form of X member in which the web portions of channel members are offset laterally and the flanges of said members are united to provide a box-like structure through which the propeller or drive shaft extends, Referring now more particularly to the drawings in detail and the modification shown in Fig. 1, the numerals 1 and 2 designate a pair of channel-shaped spaced side rails of a pleasure car frame; the flanges thereof extending inwardly toward the longitudinal center line of the frame. These side rails may be formed of any gauge material desirable and due to the arrangement of transverse braces and reinforcing structure, may be constructed of extremely light gauge stock. The web portions of the side rails throughout their length or only at certain portions thereof may be slit and expanded as at 3 to increase the height of the web portion whereby comparatively deep side rails can be obtained from comparatively small or narrow channel stock. In this manner, front and rear kick-ups or offset portions 4 and 5 may be partially formed, that is to say, those portions of the side rails adjacent the kickup may be the original width of the stock and un-expanded while the usual deeper portions of the rails may be obtained from this width stock by slitting the same longitudinally and expanding the same to greater depth, the slitting and expanding being arranged and controlled so as to cause the rails to gradually taper in height from their deeper mid-sections into the kickups to thereby form the side rails into appropriate shape. The forward ends of the two side rails are preferably, but not necessarily, connected by means of a channel-shaped front cross member 6, while the rear ends of the two side rails are connected together by a transversely extending cross brace 7 in the form of a comparatively wide plate 7 riveted at its ends to the side rail and is usually employed as the cover of the gasoline tank carried at the rear end of the vehicle. This plate is of inverted trough shape and is formed with its two longitudinal margins provided with laterally extended horizontal flanges 8 for riveting to the lower flanges of the side rails, while the transverse margins of the top portion are riveted to the upper flanges of the side rails.

The top of this transverse plate is provided with a plurality of apertures 9, the edges of which are bent into flanges preferably extending downwardly for reinforcement. To further augment its rigidity, the top of this plate is provided between the apertures with transversely extending depressed portions 10, pressed downwardly from the general plane of the top of plate 7.

The two side rails are tied together adjacent their mid-sections by an X-shaped cross brace designated in its entirety by the numeral 11, and a similarly shaped X-shaped cross member 12 is provided for connection of the forward ends of the rails to rigidify the forward end of the frame and prevent the objectionable weaving or shimmying thereof when the vehicle is being driven over rough roads.

As illustrated in Fig. 1, the X-shaped member is formed of four separate arms of channel-shaped cross section arranged and united by top and bottom gusset plates 13 and 14 respectively into cruciform shape, but with sufficient clearance in the case of the member 11, between these gussets and the ends of the four arms to provide ample clearance for a propeller or drive shaft extending from the transmission to the differential. It will be noted that each pair of diagonal arms of the cross brace are arranged in longitudinal alignment and extend diagonally between the two side rails as illustrated. The edges of the gussets 13 and 14 between each pair of arms are provided with flanges 15 extending vertically and each gusset between pairs of arms may have depressed triangular areas to further rigidify the body of the X member. As far as described, this same construction prevails for the front X member 12, with the exception that the ends of the four arms may extend closer to one another since drive shaft clearance through the intersection is not necessary as is understood by those skilled in the art.

The two rear arms 16 of the X member 11, which converge forwardly toward the longitudinal center line of the frame and the gussets 13 and 14, have their flanges facing inwardly of the longitudinal center line so that their rear ends 17 may be nested within the channels of the side rails and along the rear kickups 5 to reinforce the same. Both the webs and flanges of these ends 17 may be riveted to the webs and flanges of the side rails as illustrated and extend a substantial distance therein. If preferred, and as shown in Fig. 5, the webs of the ends 17 may be spaced from the webs of the side rails to form box-like cross sections over the rear kickups. In the event of the arms 16 being arranged with their flanges extending outwardly toward the side rails, they may then be the same height as the side rails so as to cause their flanges to be arranged in the same plane as the flanges of the side rails to be welded thereto and thereby form a box section with the rear portions of the rails, of larger cross section than that provided when the ends of the arms are nested within the side rails. In the case of nesting the ends 17 within the side rails, the web portions of these ends, as shown in Fig. 16, may be provided with lateral offset portions 18 spaced from the webs of the side rails while alternate offset portions 19 of the ends may be suitably secured to the webs of the side rails by riveting, spot welding or otherwise. Where either or both the arms of the X-shaped member and the side rails are formed from very light gauge stock, such as $\frac{1}{32}''$, and there is danger of crushing this thin stock around the rivets, heavy gauge shim plates 20 may be spot-welded as at 21 to those portions of the side rails or cross members which will receive the rivets so that the rivet heads will bear upon the shim plates to preclude the possibility of crushing the thin gauge stock adjacent thereto. As an alternative, rivets having enlarged heads engageable with the thin stock and covering a larger area than usual may be employed. In Fig. 9, the arms 16 of the X member are shown constructed of thin gauge material interposed between heavier gauge flanges of the side rail and thick shim plates 20. In Fig. 10 both the side rails and cross members are illustrated as being of comparatively thin stock with the shim plates 20 spot-welded to the exterior surfaces of the flanges of the side rail 1 and to the inner surfaces of the flanges of the cross member 16.

The forward arms 22 of the rear X member 11 are also of channel cross section, but unlike the rear members, they have their flanges facing outwardly toward the side rails to be nested within the channels of the side rails whereby the flanges of these elements may be riveted or welded together and provide the side rails with hollow or box-like cross section approximately from the dash line on forwardly to the forward end of the frame. These arms 22 may extend any desired distance along the side rails and all the way up to points adjacent the forward ends thereof to be united to the middle of or to any points along the cross member 6 or to the gusset plates 13 and 14 of the forward X member 12. However, in the preferred embodiment, the arms 22 are shown bent as at 23 to parallel the side rails and then again to converge forwardly of the frame to meet the gussets 13 and 14, which for purposes of interpretation may be construed as forming a part of a straight transverse cross member. Where the flanges of the arms are riveted to the flanges of the side rails, the web portions of the angularly disposed portions 23 of arms 22 are provided with apertures 24 to facilitate the riveting operation or these portions of the webs may be slit and expanded to provide openings as well as to increase the overall height of these portions of the arms, leaving the remaining portions of the arms unexpanded and of their original stock size. The same perforated or expanded construction may be resorted to in the event it is desired to butt-weld the flanges of the arms 22 to the flanges of the side rails as illustrated in Fig. 4 to provide a boxed in portion of the side rail of larger cross section than would be possible with the riveted construction of the same size stock.

In order to support the rear end of the motor and to further reinforce the connection between the X-member 11 and the side rails, rear motor supporting brackets 25 are riveted to the side rails and arms 22 at points adjacent the points of merger between the arms and side rails as illustrated.

As will be seen, the forward ends of the arms 22 are bent inwardly to extend toward the longitudinal center line of the frame and to meet the gussets 13 and 14 of the forward X member 12 to be riveted to such gussets. It will thus be obvious that the arms 22 form common parts of the two X members, and each arm consists of a channel section having inwardly directed ends. The balance of the forward X member is constituted by forward arms 26 of channel-shaped cross section with the flanges thereof extending inwardly in the same direction as the flanges of the side rails. The forward ends of these arms 25 are riveted either to the side rails or to any points along the forward cross member 6, while their rear ends are suitably riveted or otherwise secured to the gussets 13 and 14 of the forward X member.

In the modified form of double X frame shown in Fig. 6, two pieces 27 and 28 of channel-shaped stock are employed to form both X-shaped members, it being noted that the forward end 29 of the member 27 extends through an opening in the web of the forward end 30 of member 28 to reach from one side rail 1 to the other side rail 2, the points of intersection of these two members being riveted or otherwise suitably secured together. Portions 31 of the two members rearwardly of the portions which extend parallel to the side rails are bent to converge inwardly and rearwardly of the frame to meet the gussets 32 after which they are bent outwardly as at 33 in rearwardly diverging relationship to again meet the side rails and extend therealong for any suitable distance to achieve the results desired. The flanges of the members 27 and 28 may face in either direction as explained hereinbefore for attachment to the side rails and at their juncture by riveting, welding or in any other desired manner. When the flanges of these two members are faced inwardly toward each other they may be butt-welded together or their flanges overlapped and riveted to take the place of the gussets 32, in which event the portions of these members extending parallel to the side rails would have to be nested therein as shown in Fig. 5. However, when the flanges of these two members face outwardly and toward their respective side rails, the portions thereof which meet and extend parallel to the side rails may have their flanges welded to the flanges of the side rails to box in and reinforce certain portions in the rails.

In the form illustrated in Fig. 8 the two members 27 and 28 are in single lengths of stock, but the forward ends 29' thereof, instead of reaching over to the complementary side rails as in Fig. 6, are bent back and extended in forwardly diverging relationship as at 34 to be secured to either the side rails or the front cross member.

Instead of forming the two X members of two lengths of stock as in Figs. 6 and 8, they may both be formed from three pieces of stock by providing a substantially V-shaped cross member 35 having its ends diverging outwardly and forwardly of the frame to be secured to the two side rails at its ends. Two members of channel shaped cross section 27' and 28' in this instance, constitute the major part of the two X members and their forward ends converge inwardly toward the longitudinal center line of the frame to be connected directly to the cross member 35 or to a gusset 36 secured thereto. These two members 27' and 28' then extend parallel with the side rails to be secured thereto in any suitable manner and extend to a point where they are directed diagonally to intersect at point 37 on the longitudinal center line of the frame and reach on toward the opposite side rail of the frame to be secured thereto as at 38. The diagonally disposed portion 39 of the member 28' is illustrated as passing through the web portion of the diagonal part of member 27' and in order to provide proper propeller shaft clearance, a construction similar to that illustrated in a co-pending application may be employed. That is to say, the web portions of these diagonally extending parts of the members adjacent the intersection 37 may be slit and bent to provide an opening sufficient for the extension of the propeller shaft through the intersection 37. The cross member 35 may be a straight transverse brace and the forward ends of members 27' and 28' may converge to meet at and be secured to the middle of such member. In all of the modifications, details of construction and relationship of parts described in conjunction with other figures may be successfully employed.

In the modification shown in Fig. 11, a single X-shaped member is applied for rigidifying the frame including side rails 40 and 41 of channel-shaped cross section. These side rails are connected together by suitable transverse front and rear members 42 and 43 respectively, which are preferably of channel-shaped cross section with their ends nested within the channels of the side rails. The two arms 44 of the X-shaped member are of channel cross-section with their flanges extending toward the flanges of the two side rails and are arranged in forwardly diverging relationship until they meet the side rails adjacent the dash section, from which point extensions 45 of these arms extend along parallel with the side rails up to a point adjacent their ends where they are bent inwardly toward the longitudinal center of the frame to provide angularly disposed ends 46 which extend substantially at right angles to the side rails to be secured as at 47 to the medial portion of the front cross brace 42. As will be noted, the angular portions 48 of these arms extend diagonally across the front corners of the frame thereby forming an arrangement of parts which contribute largely to reduction of lateral vibration or shimmy of the front end of the frame. It will also be noted that the portions 45 parallelling the side rails form therewith a hollow or box-like structure which extends all along the forward ends of the side rails and the kickups or offset portions thereof. In Fig. 11, the portions 45 of the arms have been shown nested within the side rails and riveted thereto, but if preferred, the flanges of the X-member may be arranged in the same plane with the flanges of the side rails and butt-welded thereto as illustrated in Fig. 14.

The rear ends of the arms 44 are not secured with their webs together but these webs are spaced apart to provide propeller shaft clearance and are rigidly secured in this relationship by top and bottom gusset plates 48 riveted to the upper and lower flanges of the two members.

The rearwardly extending arms 49 of the X member are arranged with their flanges or channels facing inwardly toward one another and the ends of these arms are preferably nested within the rear ends of the arms 44, and the same rivets which secure the gussets 48 to the flanges of arms 44 also pass through the flanges of the arms 49, thereby providing each side of the intersection of the arms with a pair of longitudinally extending hollow or boxed-in sections to further reinforce the X member. The arms 49 diverge rearwardly of the frame and meet the side rails just in advance of the rear kickup portions 50 to be nested within the rails and riveted thereto. These rear kickup portions may be additionally reinforced by the nesting of correspondingly shaped channel sections 51 within the channels of the side rails, in which event the rear ends 52 of the arms 49 are nested within these reinforcing channel sections 51. Both the arms 49 and the reinforcing sections 51 are secured to the side rails by means of the rivets 53 passing through their flanges.

In the modification shown in Fig. 17, sections separate from the arms of the X member are employed for boxing in sections of the side rails but are connected to the latter and to the arms of the X member in a manner so that they form, in effect, extensions or continuations of said arms. This construction of parts also enables the flanges of the X member to be disposed inwardly and toward each other to form a tubular juncture in the X member for the extension of the propeller shaft in pleasure car chassis. The side rails 54 and 55 are provided with front and rear kickup portions and are connected at their rear ends by channel shaped cross member 56 having its web arranged vertically and its ends disposed within the ends of the side rails to be riveted thereto as shown. The X member in this instance is formed with a pair of channel shaped arms 57 which have their free ends nested within the side rails adjacent the rear motor support and these arms converge inwardly toward the longitudinal center of the frame with their webs vertically disposed and their flanges opening inwardly toward each other. The intermediate portion 58 of each arm is bent to be arranged parallel to the side rails and are connected together by means of top and bottom gusset plates 59 to form a tubular center for the X member for the projection therethrough of the propeller shaft. If desired, these gusset plates 59 may be eliminated as shown in Fig. 25 by making the flanges 60 of the intermediate portion 58 wider than the flanges in the remaining portions of the arms and offsetting laterally the intermediate portions 61 of the two webs so that when the flanges of these two arms are welded or riveted together as illustrated, sufficient clearance is permitted for the extension of the propeller shaft. The gusset plates can also be eliminated by connecting the two arms together by means of struck out portions 62 of the intermediate portion 58 as illustrated in Fig. 22. In other words, a portion of the web of each part 58 is struck out and bent at substantially right angles thereto for connection to the web of the opposite arm. Apertures 63 are provided in the struck out portion 62 for the extension of the propeller shaft. The arms 64 of the X member which diverge rearwardly of the frame and meet the side rails adjacent the rear kickup portions, have portions of their webs struck out and deflected to extend between the flanges to be spot welded as at 66 thereto for providing additional strength in the arms. The rear ends of these arms 64 are nested within the side rails at the kickup portions and are secured thereto in any suitable manner. For additional bracing of the rear portion of the frame, a cross brace 67 of Z-shaped cross section is provided with its two ends nested within the rearward extensions of the arms 64 and riveted to the flanges thereof as illustrated. If desired, the rear ends of the arms 64 which are nested within the side rails may be provided with offset portions similar to those 19 shown in Fig. 16 for providing a box effect for the sections of the rails within which are nested the ends of the X-member.

The forward ends of the side rails are boxed in or made hollow in cross section by the attachment of sections 68 of channel-shaped cross section with their flanges engaging the inner surfaces of the side rail flanges and riveted thereto as shown. These sections fit within the side rails and extend from points adjacent the rear motor support all of the way up to the extreme forward end of the rails. This nesting arrangement is better shown in Fig. 19 and it will be understood that the flanges of the extension 68 may be arranged in the same plane with the side rail flanges and welded thereto to impart tubular cross section to the forward ends of the side rails. The forward ends of the arms 57 of the X member meet the side rail where the extensions 68 terminate; the free ends of the arms 57 being slightly offset and inserted under the flanges of the extension 68 to be riveted thereto and to the flanges of the side rail so that extensions 68, are in fact, extensions or continuations of the arms 57 to box in portions of the side rails. Suitable apertures 69 are provided in the extension 68 to render riveting possible and these apertures may of course be dispensed with if the side rails are constructed of expanded metal or the web of the extension 68 is likewise formed from expanded metal thereby giving access to the interior of the boxed in sections.

The forward ends of the extension 68 extend beyond the forward ends of the side rails as at 70 and are laterally enlarged. This construction is especially desirable for automobiles employing front wheel drives. The free ends of the extension 68 are connected by means of a transverse member 71 which is bowed or curved downwardly between the side rails. This cross member is provided with an embossed longitudinally extending rib 72 and the ends of the cross member are angularly disposed and riveted to the top flange of the extension 68. A bottom plate 73 is riveted to the laterally extending flanges of the cross member 71 and its ends are bent outwardly and under the lower flanges of the extension 69 to be secured thereto. In order to suitably reinforce the extended ends of extension 68, substantially rectangular stampings 74 are nested between the flanges of the extension and are provided at their inner edges with vertical flanges 75 which may be riveted or otherwise suitably secured to the web portions of extensions 68 by means of the rivets 66. Additional rivets 77 are employed for connecting the flanges of the forward ends of the side rails with the flanges of extensions 68 and the free ends of the rectangular stampings 74. Thus, an extremely rigid forward end is provided for the frame which is not subject to the objectionable weaving action and shimmy so prevalent in some cars.

In Fig. 23 a modified form in this construction is shown wherein the forward ends of the side rails 55 extend beyond the ends of extensions 68 as is more customary in pleasure car frames. In this modification, a front transverse member 78 of tubular cross section connects the forward ends of the side rails, and the forward ends 79 of extensions 68 are bent inwardly toward the longitudinal center of the frame to have their free ends rigidly secured to the cross member 78. In order to brace the cross member 78 from its forward side, additional channel shaped braces 80 connect the cross member adjacent its medial section to the extreme forward end of the side rail.

It is to be understood that various changes in the size, shape and relation of parts may be resorted to without departing from the spirit of the invention or the scope of the appended claims.

I claim:

1. In a vehicle frame, a pair of side rails of channel shaped cross section, and an X-shaped brace member connecting the rails and having a pair of arms, parts forming extensions of said arms being extended along portions of the rails to form said portions into hollow cross section.

2. In a vehicle frame, a pair of side rails of channel-shaped cross section, a cross member connecting the same, and an X-shaped brace member connecting the rails and having a pair of arms, parts forming extensions of said arms being extended along portions of the rails to form said portions into hollow cross section, and the ends of said parts being connected to said cross member.

3. In a vehicle frame, a pair of side rails, an X-shaped brace member connecting the same and having a pair of arms, parts forming extensions of said arms extending along the side rails for a substantial distance and secured thereto, and said parts being extended toward the longitudinal center of the frame and connected with each other and then extended back to its respective side rail and connected thereto to form a second cross brace connecting the side rails, and having angularly disposed arms.

4. In a vehicle frame, the combination with a pair of side rails having tubular cross section from points adjacent the dash section to points adjacent their forward ends; of an X-shaped brace member arranged rearwardly of the tubular portions of the rails and connecting the rails, and the forward arms of the X-member being connected to the rails at the rear ends of said tubular portions.

5. In a vehicle frame, a pair of side rails of channel cross section, a transverse brace connecting the same and including a channel section having its channel facing inwardly of the center of the frame, sections of channel cross section having their flanges extending toward and secured to the side rail flanges to form portions of the rails into tubular cross section, said sections extending along the side rails toward the brace, and the ends of said sections being bent inwardly to converge and meet the brace and extend along the same for attachment thereto to form said brace into hollow cross section.

6. A chassis frame for motor vehicles comprising a pair of side sills of channel cross section, a forward cross member of closed box cross section, an X cross member in the central portion of the frame spaced a substantial distance from said forward cross member, and a member for closing the channel in the portion of each of said sills extending between said forward cross member and X cross member, thereby imparting rigidity to said frame.

7. A chassis frame for motor vehicles comprising a pair of side sills of channel cross section, a forward cross member, an X cross member in the central portion of the frame spaced a substantial distance from said forward cross member, and a member for closing the channel in the portion of each of said sills extending between said forward cross member and X cross member, thereby imparting rigidity to said frame.

8. A vehicle frame comprising two spaced side rails, a tubular brace interconnecting said side rails at corresponding points adjacent their front ends, two brace members of channel shape cross section, each secured at one end to one of said side rails and converging rearwardly, two additional brace members of channel shape cross section, each secured at one end to one of said side rails and converging forwardly, said four brace members being so disposed that the planes of the webs thereof intersect at a point midway between the side rails, and means securing the adjacent portions of said four brace members together, said side rails being of tubular cross section intermediate said front brace and the points at which the forward brace members engage the side rails.

9. A vehicle frame comprising two spaced side rails of channel shape cross section, a transversely disposed tubular brace interconnecting said side rails at points adjacent their front ends, a channel member disposed parallel to a portion of each side rail and secured to the flanges thereof to form a tubular cross section, the front ends of said channel members being secured to said tubular brace and the rear ends thereof extending angularly rearwardly towards each other, means securing the rear ends of said channel members together, and additional channel members secured to said means and extending angularly rearwardly towards and connected at their ends to said side rails.

10. A chassis frame for motor vehicles comprising a pair of side sills of channel cross section, a forward cross member of closed box cross section, an X cross member in the central portion of the frame spaced a substantial distance from said forward cross member, and a member for closing the channel in the portion of each of said side sills extending between said forward cross member and X cross member secured to the edges of the flanges of said channel, thereby imparting rigidity to the frame.

11. A chassis frame for motor vehicles comprising a pair of side sills of channel cross section, a forward cross member of closed box cross section, an X cross member between said sills in the central portion of the frame, and a member for closing the channel of the portion of each of the side sills between said forward cross member and X-member secured to the edges of the flanges of said channel and also secured to said forward and X cross member.

12. In a vehicle frame, a pair of side rails, a transverse member connecting the same, an X-shaped brace member connecting the rails and having a pair of arms, parts forming extensions of said arms being extended along in parallel with portions of the side rails to form them into hollow section, and the ends of said parts being directed inwardly toward the center of the frame and connected to the transverse member at an angle thereto to form therewith a second cross brace with angularly disposed arms.

13. A chassis frame for motor vehicles comprising a pair of side sills of channel cross section, a forward cross member of closed box cross section, an X-cross member between said sills in the central portion of the frame, a member for closing the channel of the portion of the side sill between said forward cross member and X cross member secured to the edges of the flanges of said channel and also secured to said forward and X cross members, and a diagonal brace between said forward cross member and the closed box portion of said side sill secured thereto.

14. A chassis frame for motor vehicles comprising a pair of side sills of channel cross section, a forward cross member, an X cross member between said sills in the central portion of the frame, a member for closing the channel of the portion of the side sill between said forward cross member and X cross member secured to the edges of the flanges of said channel and also secured to said forward and X cross members, and a diagonal brace between said forward cross member and the closed box portion of said side sill secured thereto.

15. A chassis frame for motor vehicles comprising a pair of side sills of channel cross section, a forward cross member of closed box cross section, an X cross member in the central portion of the frame spaced a substantial distance from said forward cross member, and a member for closing the channel in the portion of each of said side sills extending between said forward cross member and X cross member, said X cross member comprising diagonal beams having web and flange portions, said web and flange portions of each component beam extending in a direct line from a substantially common point of intersection to the side sills, portions of the webs of said beams being cut away at the intersection to form an aperture for the passing and the movement of the propeller shaft.

16. An automotive frame comprising two spaced side rails of channel shape cross section, a transversely disposed front brace interconnecting said side rails, and an X-frame interconnecting intermediate portions of said side rails, the forwardly extending arms of said X-frame being bent into parallelism with said side rails and secured to both flanges thereof, and the front ends of said arms being bent inwardly into spaced relationship with said side rails and secured at their ends to said front brace at points in spaced relation with said side rails.

17. A chassis frame for motor vehicles comprising a pair of side sills of channel cross section, a forward cross member of closed box cross section, an X cross member in the central portion of the frame, spaced a substantial distance from said forward cross member and a member for closing the channel in the portion of each of said sills extending between said forward cross member and X cross member welded to the edges of the flanges of said channel thereby imparting rigidity to said frame.

18. A chassis frame for motor vehicles comprising a pair of side sills of channel cross section, a forward cross member of closed box cross section, an X cross member between said sills in the central portion of the frame, and a member for closing the channel of the portion of the side sill between said forward cross member and X cross member and welded to the edges of the flanges of said channel and also welded to said forward and X cross members.

19. In an automobile frame, two opposed sheet metal channel-shaped side rails extending longitudinally of the frame, a cross bar connecting said side rails at the forward end thereof, an X-member connecting said side rails rearward of the cross bar, and sub-rails extending forwardly from the forward legs of said X-member along said side rails to strengthen the latter, said sub-rails extending to connect with said front cross bar intermediate its ends to increase the rigidity of the frame.

20. A vehicle comprising two spaced channel-shaped side rails, a transversely extending brace member interconnecting said side rails at points adjacent their front ends, angularly disposed bracing members each connected to said side rails at points intermediate their ends, means disposed intermediate said side rails and interconnecting said angular bracing members, and means for forming struts joining the free edges of the flanges of said side rails and extending from said transverse brace to said angular braces to form said side rails into closed box-shaped cross section.

21. A vehicle frame comprising two spaced channel-shaped side rails, a transversely extending brace member interconnecting said side rails at a point adjacent their forward ends, a torsion and shear absorbing and stress transmitting member between said side rails spaced a substantial distance rearwardly from the first brace member and having four of its radiating arms secured to the side rails fore and aft of the mid-section, of the frame and including a pair of forwardly diverging arms secured to the side rails at points spaced a substantial distance rearwardly of the first brace member, and sub-rail members secured to said arms and extending forwardly therefrom along said side rails to connect with said first brace member and secured to the side rails to form them into hollow, rectangular, box-shaped cross section.

22. A vehicle frame comprising two spaced channel-shaped side rails, a transversely extending brace member interconnecting said side rails at points adjacent their forward ends, a torsion and shear absorbing and stress transmitting member of substantially X-shape between said side rails spaced a substantial distance rearwardly from the first brace member and having four of its radiating arms secured to the side rails fore and aft of the mid-section of the frame and including a pair of forwardly diverging channel-shaped arms secured to the side rails at points spaced a substantial distance rearwardly of the first brace member, and channel-shaped sub-rail members secured to said arms and extending forwardly therefrom along said side rails to connect with said first brace member, said sub-rails being nested within said side rails with their flanges secured to the flanges of the side rails and their webs spaced from the webs of the side rails to form the latter into hollow rectangular box-shaped cross section from points adjacent the forward brace member all the way back to the points of connection between the sub and side rail members.

23. A vehicle frame comprising two spaced channel-shaped side rails, a transversely extending brace member interconnecting said side rails at points adjacent their forward ends, a torsion and shear absorbing and stress transmitting member of substantially X-shape between said side rails spaced a substantial distance rearwardly from the first brace member and having four of its radiating arms secured to the side rails fore and aft of the mid-section of the frame and including a pair of forwardly diverging channel-shaped arms secured to the side rails at points spaced a substantial distance rearwardly of the first brace member and channel-shaped sub-rail members secured to said arms and extending forwardly therefrom along said side rails to connect with said first brace member, said sub-rails being nested within said side rails with their flanges secured to the flanges of the side rails and their webs spaced from the webs of the side rails to form the latter into hollow rectangular box-shaped cross section from points adjacent the forward brace member all the way back to the points of connection between the sub and side rail members, and the forward ends of said sub-rails being bent inwardly and secured to said first named transversely extending brace.

24. In a vehicle frame, a pair of channel-shaped side rails, a front cross member, an X-shaped brace member in the central portion of the frame, a member for closing the channel of the portion of each side rail between the front cross member and X-shaped member and the forward ends of said members being directed inwardly to converge and be secured to the front cross member.

25. In a vehicle frame, a pair of channel-shaped side rails, a front cross member having a pair of forwardly diverging arms secured to the side rails, an X-shaped cross member in the central portion of the frame having forwardly extending arms extending along the side rails to form the same into hollow section, and the forward ends of said X-member arms extending angularly inward of the frame, in inwardly converging relation to cooperate with the arms of the front cross member in forming a second X-shaped member at the front of the frame.

ROBERT H. MADDOCK.